UNITED STATES PATENT OFFICE.

AMOS E. DUNCAN, OF YELLOW SPRINGS, OHIO.

DISINFECTANT.

SPECIFICATION forming part of Letters Patent No. 309,211, dated December 16, 1884.

Application filed May 2, 1884. (No specimens.)

*To all whom it may concern:*

Be it known that I, AMOS E. DUNCAN, a citizen of the United States, residing at Yellow Springs, in the county of Greene and State of Ohio, have invented certain new and useful Improvements in Disinfecting, Antiseptic, and Deodorizing Compounds; and I do hereby declare the following to be a full, clear, and exact description of the invention, such as will enable others skilled in the art to which it appertains to make and use the same.

My invention relates to a new, useful, and safe disinfecting, antiseptic, and deodorizing agent peculiarly adapted to sanitary purposes, as hereinafter specified; and it consists in compounding together, in substantially the proportions given, the ingredients mentioned in the following formula.

It also consists in the mode of preparing and adapting the compound, as well as in the mode of using it when prepared.

Objections are urged against the several disinfecting and deodorizing agents and compounds now offered to the public, particularly those which produce hydric chloride. Some are so violent in their action as to be too dangerous to handle. Others are dangerous because of the noxious gases generated. Others, again, have no lasting qualities, losing their strength and properties immediately they are exposed, while still others are peculiarly offensive, or so crystallize that they cannot be reused, and none, when once exposed, can be brought again under control.

It is the design and purpose of my compound and invention to overcome these difficulties.

Practical and continuous tests have clearly demonstrated that when properly prepared my compound is perfectly harmless to handle or to use; the public may handle it with impunity; that it emits no offensive, unwholesome, or noxious gases or smells; that when used, though wasting slowly, its action is instantaneous, continuous, subtile, effective, thorough, and lasting; that it is wholly under control and easily managed, may be started and stopped at will, and is always friable and exceedingly cheap.

Formula: Take of cellulose (the ordinary form of woody matter) about, say, nine pounds; manganic dioxide, about, say, ten pounds; sodic chloride, about, say, forty-two pounds, and reduce to an impalpable powder, observing to carefully and thoroughly mix the whole together.

I do not confine myself to the letter of the formula in the quantities given, observing merely and preferring approximately the proportions stated.

The compound thus prepared is ready for immediate use in any desired bulk; but when preparing the compound for market to be handled and shipped, I prefer to and do add to the formula heretofore given, of ferrous sulphate about, say, two pounds, making gross sixty-three instead of sixty-one pounds. While ferrous sulphate adds nothing materially to the disinfecting, antiseptic, and deodorizing properties of the compound, it is a valuable ingredient, in that it contributes materially in keeping the other ingredients more uniformly distributed throughout the mass, and produces a compound that can be handled and transported with greater satisfaction.

Mode of using: When prepared after either formula, take the quantity of the compound desired, put it into a glass, gutta-percha, glazed stone jar, bottle, or any other receptacle of any form, one with a mouth or neck that can be easily closed by a cork or lid being preferred, and pour upon it a small quantity (say from a few drops to several spoonfuls) of a suitable mineral acid—as, for instance, sulphuric acid—and set in the room or place to be disinfected. The acid acting upon the compound causes a slow, steady, and continuous chemical change to take place therein, slowly generating and throwing off a continuous innocuous column of chlorine, which, escaping into the surrounding atmosphere, subtilely penetrating to the remotest corners, unites with the hydrogen therein, instantly integrating, breaking up, and dispelling all foul, noxious, or deleterious gases, odors, and fumes, expeditiously, almost instantaneously, purifying the most fetid, poisonous, and foul air or place, and neutralizing the most offensive odors. Should the place to be purified be exceedingly offensive, by continuously adding to the compound small quantities of acid from time to time, according to the noxious condition—say at first once in every few hours, then once every few days, and later once in a few weeks—the most beneficial result will follow. This can readily be regulated by any observer, as the presence of ammoniacal and other noxious gases can readily be discovered by a light bluish cloud, caused by the uniting of the chlorine with the foul gases.

Having now fully described my invention and the mode of making and adapting it, what I esteem as new, and seek to protect by Letters Patent, is—

1. A composition of matter consisting of cellulose, manganic dioxide, and sodic chloride, as herein set forth.

2. A composition of matter from which antiseptic, deodorizing, and disinfecting gases are evolved by means of a weak acid—such as sulphuric acid—consisting of cellulose, manganic dioxide, and sodic chloride, substantially as and for the purpose set forth.

3. The composition of manganic dioxide, sodic chloride, cellulose, and a suitable acid, substantially as and for the purposes set forth.

In testimony whereof I have affixed my signature in presence of two witnesses.

AMOS E. DUNCAN.

Witnesses:
 JNO. B. BROWNLOW,
 M. A. CLANCY.